A. C. JACOBI.
FRICTION CLUTCH.
APPLICATION FILED NOV. 6, 1919.

1,383,813.  Patented July 5, 1921.

WITNESSES

INVENTOR
A. C. JACOBI
BY
ATTORNEYS

UNITED STATES PATENT OFFICE.

AUGUST C. JACOBI, OF SUNNYVALE, CALIFORNIA.

FRICTION-CLUTCH.

1,383,813.  Specification of Letters Patent.  Patented July 5, 1921.

Application filed November 6, 1919. Serial No. 336,016.

*To all whom it may concern:*

Be it known that I, AUGUST C. JACOBI, a citizen of the United States, and a resident of Sunnyvale, in the county of Santa Clara and State of California, have invented a new and Improved Friction-Clutch, of which the following is a description.

My invention relates to a friction clutch associated with a drive element and a driven element to cause the driven element to be clutched by the drive element when the latter is turned forwardly and to release the driven element when the drive element is reversed or when the driven element is turned by other means in a forward direction at a higher speed than the drive element.

The invention more particularly relates to an automatic one-way friction clutch which while adapted for use in any machines or vehicles involving a drive element and an element adapted to be driven, the invention is especially adapted for use in cranking automobiles.

My invention has for an object to provide a friction clutch of the indicated character which will instantly and unfailingly cause the driven element to be engaged in the clutching movement and which will instantly and automatically release the driven element.

A further important object of my invention is to provide a clutch which will be noiseless in its operation.

More specifically, I have in view to provide an embodiment of the invention reflecting important considerations with respect to simplicity and durability as well as the convenience of assembling the parts and of disassembling the same when required for repairs or the like.

Reference is to be had to the accompanying drawings forming a part of this specification, it being understood that the drawings are merely illustrative of one example of the invention.

Figure 1:
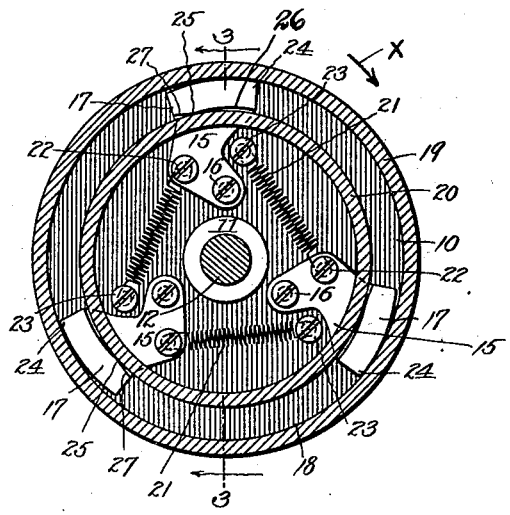
Figure 1 is a section on the line 1—1, Fig. 3.
Figure 2:
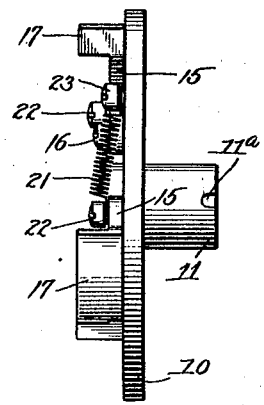
Fig. 2 is an edge view of a drive element carrying the clutch devices.
Figure 3:
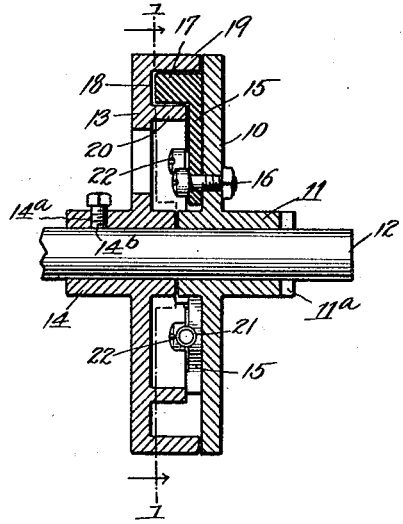
Fig. 3 is a section on the line 3—3, Fig. 1.
Figure 4:
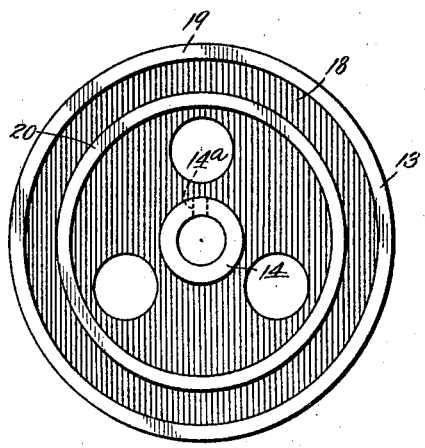
Fig. 4 is a view of the inner side of the driven element.

In the illustrated example of my invention, the element 10 is a drive element and has its hub 11 loose on a shaft 12, the hub being shown as having teeth $11^a$ adapted to receive corresponding teeth on the crank of an automobile when the crank is engaged for cranking the automobile. The driven element 13 has its hub 14 fast on the shaft 12 by any suitable means, said hub being shown as having a hole $14^a$ receiving a set screw $14^b$.

A series of clutch members 15 is employed, preferably 3 in number, and each clutch member is pivotally secured at its inner end as at 16 to the web of the drive element 10 to rock on a fixed center. The outer end 17 of each clutch member projects laterally in the form of a flange and extends forward and back of the pivot 16 or center of movement of the clutch member. The flange 17 extends into an annular groove 18 formed by outer and inner annular flanges 19, 20 on the driven member 13. The width of the groove 18 is only slightly greater than the depth of the flange 17 so that the latter requires to be moved only slightly to clutch the flange 19. A spring 21 is associated with each clutch member 15 tending to positively rock the same to the release position, said spring being secured at one end as at 22 to the clutch member and secured at its other end as at 23 to the web of the drive element 10. The pivots 16 and the securing means at 22 and 23 may be in the form of bolts or screws or equivalent detachable means.

The outer forward angle 24 of the clutch member is adapted to grip the inner surface of the flange 19, said angle advantageously being forward of the pivot 16. At the inner surface of the flange 17 of the clutch member the same has a bearing point 25 to engage the outer surface of the inner flange 20, said bearing point being slightly forward of the rear end of the flange 17. Forward of the bearing point 25, the flange 17 is given a form to allow clearance space 26 between said flange and the flange 20. Similarly, a shorter clearance space 27 is presented rearward of the bearing point 25 between flange 17 and the opposed surface of the flange 20.

With the described construction a forward clockwise movement of drive element 10 and clutch members 15 as indicated by arrow X Fig. 1 will cause the gripping points 24 of said clutches to engage the flange 19 of the driven element 13 and actuate the latter since the contact of said points with flange 19 will tilt said points outwardly in the movement of the clutch members about their pivots 16. Upon a forward movement of the driven element 13 at greater speed than the drive element 10, as for example in response to the starting of the engine in an automobile, the driven element 13 will automatically release itself from the clutches and turn forwardly independently of the drive element 10, since the engagement of flange 20 with the clutch members is at 25, or rearward of a radial line passing through the pivotal center 16, giving a tendency to turn the clutch member forwardly about their centers and away from flange 19, or if said drive element be reversed the clutch members will release as will be obvious. In the clutching and release movements of the clutch members they will have but a very slight radial movement, so there will be no clash with resulting noise, the construction in practice having proved noiseless in operation. Upon the release movement of the clutch member the contact point 25 will come to a bearing against the outer surface of flange 20 under the action of the spring 21. The arrangement makes the clutch members sensitive to the forward movement of the drive element or the release action of the springs, said clutch members having no tendency to bind when in the release position against the inner flange 20.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. In a device of the class described, a drive element, a clutch member pivoted thereon to turn therewith and to rock on a fixed center, means tending to rock the clutch member, on said fixed center to the release position, and a driven element having inner and outer annular flanges presenting an annular groove therebetween, said clutch member having a lateral member receivable in said groove and adapted to engage the outer flange by a relative forward movement of the drive or to engage against the inner annular flange when released.

2. A device of the class described including a drive element, a clutch member pivoted on said drive element to turn therewith, and a driven element having inner and outer annular flanges, said clutch member having a lateral part extending between said flanges and adapted upon a forward movement of the drive element to engage the outer flange and in the release position adapted to bear against the inner flange; together with spring means tending to positively rock said clutch member to the release position.

3. A device of the class described including a drive element, a clutch member pivoted at its inner end to said drive element to rock about a fixed center, the outer end of said clutch member extending forward of said fixed center and rearward of the same, and a driven element having inner and outer flanges between which the outer end of the clutch member extends laterally.

4. A device of the class described including a drive element, a clutch member pivoted at its inner end to said drive element, and presenting at its outer end a laterally projecting flange extending forward and rearward of the pivotal center of the clutch member, and a driven element having inner and outer annular flanges presenting an annular groove into which the flange of the clutch member extends, said clutch flange at its inner surface having a bearing point forward of the rear end thereof, there being clearance spaces forward of said bearing point and rearward of the same between the said clutch flange and the inner flange of the driven element.

5. A device of the class described including a drive element, a clutch member pivoted at its inner end to said drive element, and presenting at its outer end a laterally projecting flange extending forward and rearward of the pivotal center of the clutch member, and a driven element having inner and outer annular flanges presenting an annular groove into which the flange of the clutch member extends, said clutch flange at its inner surface having a bearing point forward of the rear end thereof, there being clearance spaces forward of said bearing point and rearward of the same between the said clutch flange and the inner flange of the driven element; together with spring means tending to positively rock the clutch member to the release position, said bearing point contacting with the outer surface of said inner annular flange.

6. A device of the class described including a drive element, a clutch member pivoted on said drive element and presenting a lateral flange, a driven element having inner and outer annular flanges presenting an annular groove therebetween receiving said lateral flange of the clutch element, said groove being only slightly greater in width than the thickness of said lateral flange, the clutch member being adapted with a forward movement of the drive element to engage the outer flange of the driven element, and a spring tending to positively rock said clutch member to the release position and cause the flange thereof to contact with the inner flange of the driven element.

AUGUST C. JACOBI.